United States Patent

[11] 3,600,561

[72] Inventor Robert Owen Winder
Princeton, N.J.
[21] Appl. No. 861,038
[22] Filed Sept. 25, 1969
[45] Patented Aug. 17, 1971
[73] Assignee RCA Corporation

[54] DECADE COUNTER EMPLOYING LOGIC CIRCUITS

6 Claims, 6 Drawing Figs.

[52] U.S. Cl. 235/92 LG, 235/92 R, 328/45, 307/226, 235/92 MC
[51] Int. Cl. H03k 21/00
[50] Field of Search 235/92, 60, 69, 63, 96, 58; 307/226, 220, 221, 289; 328/45, 37, 48, 41—43

[56] References Cited

UNITED STATES PATENTS

| | | | |
|---|---|---|---|
| 3,403,267 | 9/1968 | Winder | 307/289 |
| 3,434,058 | 3/1969 | Winder | 328/43 |
| 3,456,126 | 7/1969 | Kaplan | 307/211 |
| 3,458,734 | 7/1969 | Kaplan | 328/37 X |
| 3,460,098 | 8/1969 | DeBlauw | 328/42 X |
| 3,508,033 | 4/1970 | Turecki | 235/92 |
| 3,519,941 | 7/1970 | Winder | 307/221 X |

*Primary Examiner*—Maynard R. Wilbur
*Assistant Examiner*—Joseph M. Thesz, Jr.
*Attorney*—H. Christoffersen

ABSTRACT: In a decade counter comprised of five threshold gates, each producing two output signals, the first signal indicative of a bit and the second of its complement. A clock pulse and its own first signal are applied to each circuit. The second signal produced by each circuit is applied to the remaining four circuits.

INVENTOR.
ROBERT O. WINDER
BY Samuel Cohen
Attorney

PATENTED AUG 17 1971

3,600,561

INVENTOR.
ROBERT O. WINDER
BY Samuel Cohen
Attorney

DECADE COUNTER EMPLOYING LOGIC CIRCUITS

BACKGROUND OF THE INVENTION

This invention was conceived in the course of a government contract for the Department of Air Force.

Decade counters are widely used in many digital applications. The object of this invention is to provide such a counter which is relatively simple and fast.

SUMMARY OF THE INVENTION

Five logic circuits each producing a first signal indicative of a bit and a second signal indicative of the complement of said bit. The first signal produced by each circuit is fed back to the same circuit and there is also fed back to each circuit the second signal produced by the remaining four circuits. A timing signal also is applied to each circuit.

DETAILED DESCRIPTION

Figure 1:
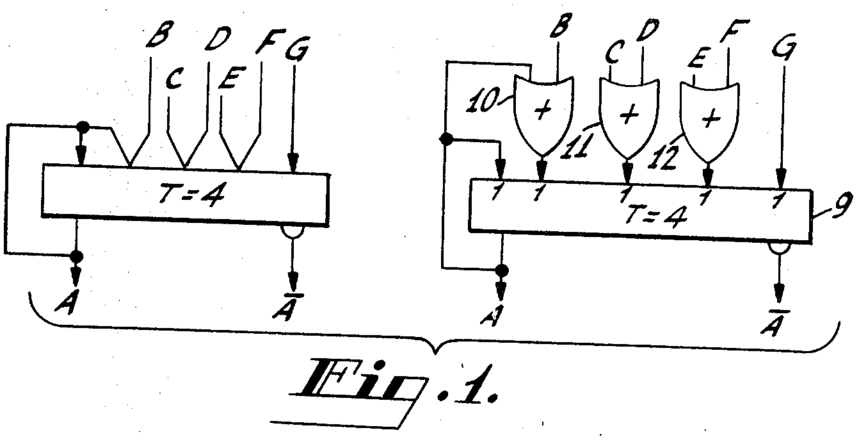
FIG. 1 shows the logic employed in the circuit of FIG. 2.

The counters of the present application are switched from state to state by an input timing signal *t* which varies in amplitude between a level representing binary 1 and a level representing binary 0. The counters each have 5 stages producing outputs *a*, *b*, *c*, *d* and *e*, respectively, such that as *t* goes through 10 cycles (during each cycle *t* changes in value from 0 to 1), the outputs *a*, *b*, *c*, *d*, *e* go through 1 cycle. (As will be shown shortly, 1 cycle consists of 20 different counter states.)

Figure 2:
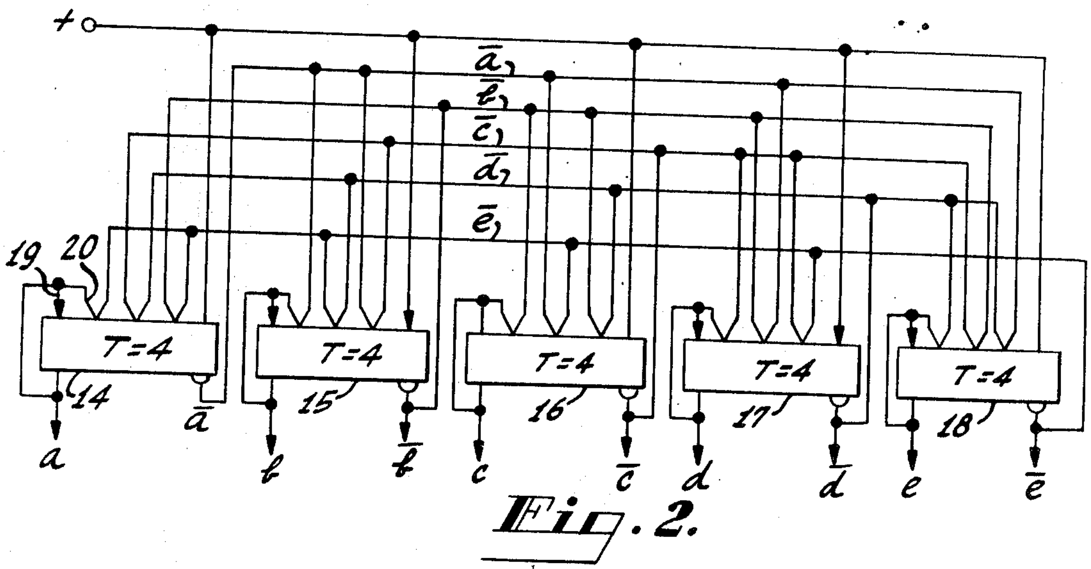
FIG. 2 is a block diagram of one form of decade counter according to the invention.

FIG. 1 shows the convention employed in the counter of FIG. 2. Each stage of the counter comprises a threshold gate 9 having five inputs, each with weight 1, and having a threshold of 4. Each stage also includes 3 OR gates 10, 11 and 12 connected to 3 of the input terminals respectively of the threshold gate 9.

The decade counter of FIG. 2 comprises five stages 14—18 such as shown in FIG. 1. Each stage has a feedback connection from the first output terminal thereof to one of its input terminals and to an input terminal to one of the OR gates of the stage. Thus, in stage 14, the signal *a* is fed back to the input terminal 19 of the threshold gate and to one input terminal 20 of an OR gate. The second signal, that is, the complement signal, produced by each stage is applied to the remaining four stages. Thus, signal $\bar{a}$ is applied to two OR gates of stage 15 and to one OR gate in each of stages 16, 17 and 18. The timing signal *t* is applied directly to the threshold gate of each stage.

The operation of the decade counter of FIG. 2 is defined by the five Boolean equations which follow.

$$e=S[(\bar{a}+\bar{d})+(\bar{b}+\bar{c})+(\bar{d}+e)+e+t-4] \quad (1)$$
$$d=S[(\bar{e}+\bar{c})+(\bar{a}+\bar{b})+(\bar{c}+d)+d+t-4] \quad (2)$$
$$c=S[(\bar{d}+\bar{b})+(\bar{e}+\bar{a})+(\bar{b}+c)+c+t-4] \quad (3)$$
$$b=S[(\bar{c}+\bar{a})+(\bar{d}+\bar{e})+(\bar{a}+b)+b+t-4] \quad (4)$$
$$a=S[(\bar{b}+\bar{e})+(\bar{c}+\bar{d})+(\bar{e}+a)+a+t-4] \quad (5)$$

In the equations above, "*S*" is the signum function. It has the value 1 when N or more of its arguments have the value 1, and otherwise has value 0, where N is the numeral within the brackets preceded by the minus sign. In the present instance, N=4. In each equation there are five arguments, three within the parenthesis and two not in parenthesis. The expressions within the parentheses denote the OR'ed inputs.

The operation of the decade counter is also described in the Truth Table which follows.

| *t* | *a* | *b* | *c* | *d* | *e* | |
|---|---|---|---|---|---|---|
| 0 | 0 | 0 | 0 | 1 | 1 | |
| 1 | 0 | 0 | 1 | 1 | 1 | |
| 0 | 0 | 0 | 1 | 0 | 1 | |
| 1 | 0 | 1 | 1 | 0 | 1 | |
| 0 | 0 | 1 | 1 | 0 | 0 | |
| 1 | 1 | 1 | 1 | 0 | 0 | |
| 0 | 1 | 0 | 1 | 0 | 0 | |
| 1 | 1 | 0 | 1 | 0 | 1 | |
| 0 | 1 | 0 | 0 | 0 | 1 | |
| 1 | 1 | 0 | 0 | 1 | 1 | |
| 0 | 1 | 0 | 0 | 1 | 0 | |
| 1 | 1 | 0 | 1 | 1 | 0 | |
| 0 | 0 | 0 | 1 | 1 | 0 | |
| 1 | 0 | 1 | 1 | 1 | 0 | |
| 0 | 0 | 1 | 0 | 1 | 0 | |
| 1 | 1 | 1 | 0 | 1 | 0 | |
| 0 | 1 | 1 | 0 | 0 | 0 | |
| 1 | 1 | 1 | 0 | 0 | 1 | |
| 0 | 0 | 1 | 0 | 0 | 1 | |
| 1 | 0 | 1 | 0 | 1 | 1 | |
| 0 | 0 | 0 | 0 | 0 | 1 | 1 |

It may be observed from the Truth Table above that for each transition of *t*, that is, for each change in value from 0 to 1 or 1 to 0 of *t*, only one of the quantities *a* through *e* changes value. An important advantage of operating in this way is that the counter is very fast—only one stage has to change its state in response to each change of the value of *t*.

A particularly attractive way of implementing the circuits of FIGS. 1 and 2 is a modified form of the threshold logic gate described by the present inventor in "Threshold Logic Will Cut Costs Especially with Use of LSI," Electronics, May 27, 1968, pages 94—103. The circuit shown on page 102, for example, may be modified in the manner shown in part in FIG. 3 to provide OR gate inputs. In the circuit shown on page 102 of the article, when a signal A represents a 1, current is steered through the transistor, corresponding to 32 of FIG. 3 into one path and when it represents a 0, current is steered through the other transistor, corresponding to transistor 30 of FIG. 3, to the other path.

Figure 3:
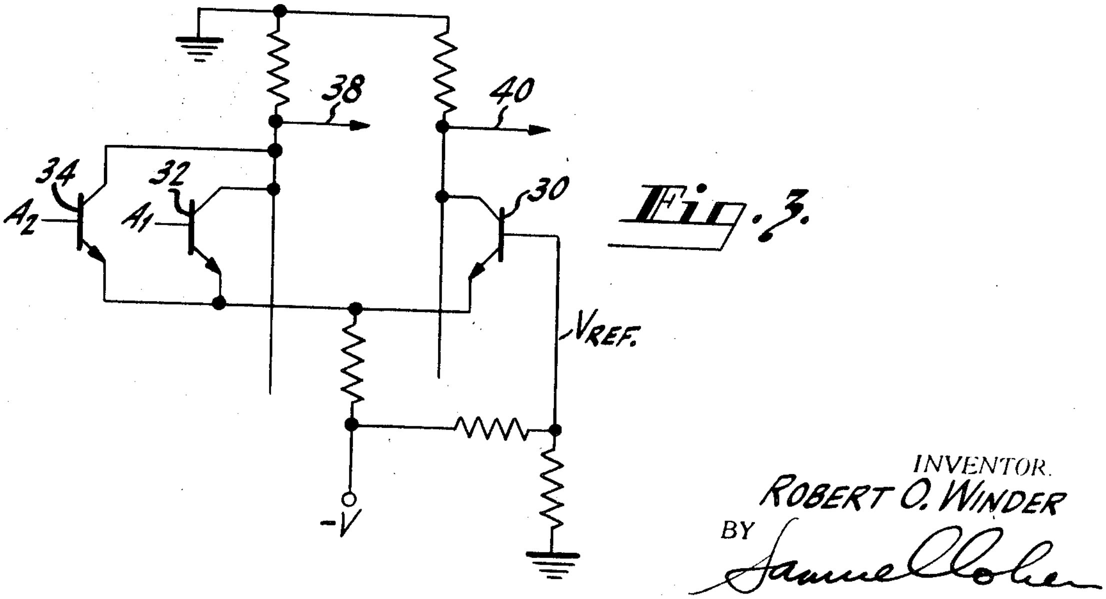
FIG. 3 is a schematic diagram to indicate how the circuits of FIG. 2 may be implemented.

The modification required to implement a two-input OR function at an input to the threshold gate is shown in FIG. 3 of the present application. Each transistor such as 32 has in shunt with its emitter-to-collector path the emitter-to-collector path of a second similar transistor 34. Now, if either $A_1$ (which in the present instance may be an input such as *a*) or $A_2$ (which in the present instance may be an input such as $\bar{e}$) represents a 1, one of the transistors 32 or 34 will conduct and a current representing 1 will flow in the collector circuit of either transistor 32 or 34.

FIG. 3 shows only one of the OR input circuits which is necessary in one stage of the present counter. A complete stage includes three sets of transistors such as 32, 34 and 30 providing three two-input OR circuits for the stage. Thus, rather than inputs A, B, C of the article there are inputs $(A_1+A_{2a}),\ (B_1+B_2)$ and $(C_1+C_2)$ and in addition, each stage has two additional inputs corresponding to D and E of the circuit of the article. In addition, the threshold of the circuit of the article is set to a value of 4 in the use contemplated of the circuit in the present FIG. 2. The remaining sets of input transistors of the circuit of the article (receiving the inputs F...N) either are eliminated or the inputs F...N are all made to carry a constant bias representing binary 0.

The circuit of the article modified in the way shown in part in FIG. 3 is attractive for implementing the present invention as it readily may be integrated. Moreover, the circuit includes means for obtaining a normal output from the signal present at one output lead and a complemented output from the signal present at the other output lead. Nevertheless, it is to be understood that this is merely one example as it is possible to implement the stages of the counter in many other ways.

Figure 4:
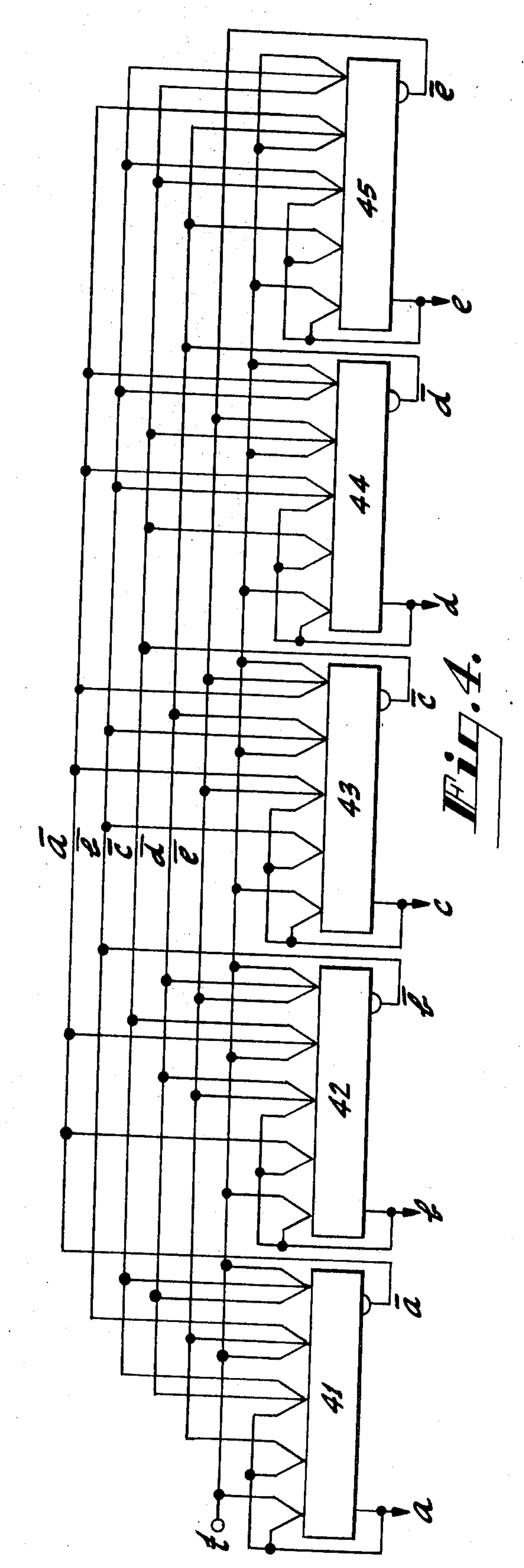
FIG. 4 is a block diagram of another form of decade counter according to the invention.
Figure 6:
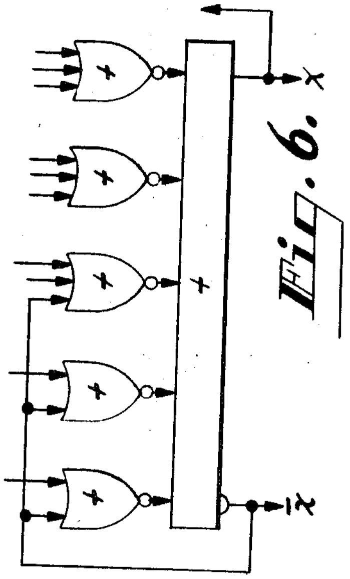
FIGS. 5 and 6 are more detailed showings of the alternative forms of logic circuits which may be employed in FIG. 4.
Figure 5:
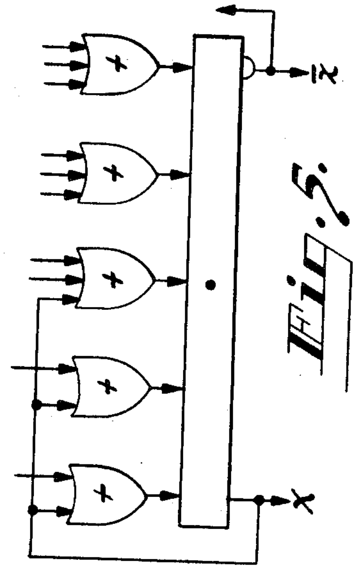

Another embodiment of the invention is shown in FIG. 4. Here, as in the circuit of FIG. 1, the uncomplemented output of each stage of the counter is fed back to the same stage, a timing signal *t* is applied to all stages of the counter, and the complemented output of each stage is applied to the remaining four stages. Each counter stage 41—45 is identical and may consist of the logic shown in FIG. 5 or of the logic shown in FIG. 6. The stage of FIG. 5 comprises five OR gates feeding an AND/NAND gate. Three of the OR gates have three input terminals and two of the OR gates have two input terminals. The circuit of FIG. 6 consists of five NOR gates feeding an OR/NOR gate. As in the circuit of FIG. 5, three of the input gates have three input terminals and two of the input gates have two input terminals.

The operation of the circuit of FIG. 4 is fully described in the five Boolean equations which follow.

$$e=(e+t)\cdot(\bar{d}+\bar{a}+t)\cdot(\bar{c}+\bar{b}+t)\cdot(\bar{c}+\bar{e}+b)\cdot(d+\bar{e}) \qquad (6)$$

$$d=(d+t)\cdot(\bar{c}+\bar{e}+t)\cdot(\bar{b}+\bar{a}+t)\cdot(\bar{b}+\bar{d}+a)\cdot(c+\bar{d}) \qquad (7)$$

$$c=(c+t)\cdot(\bar{b}+\bar{d}+t)\cdot(\bar{a}+\bar{e}+t)\cdot(\bar{a}+\bar{c}+e)\cdot(b+\bar{c}) \qquad (8)$$

$$b=(b+t)\cdot(\bar{a}+\bar{c}+t)\cdot(\bar{e}+\bar{d}+t)\cdot(\bar{e}+\bar{b}+d)\cdot(a+\bar{b}) \qquad (9)$$

$$a=(a+t)\cdot(\bar{e}+\bar{b}+t)\cdot(\bar{d}+\bar{c}+t)\cdot(\bar{d}+\bar{a}+c)\cdot(e+\bar{a}) \qquad (10)$$

While the Truth Table for the operation of the circuit of FIG. 4 is not given, it is similar to the Truth Table above in that in response to each transition of $t$ only one stage of the decade counter changes its value. Accordingly, the circuit of FIG. 4 is also capable of operating at high speed.

What I claim is:

1. A decade counter comprising, in combination:

five logic circuits, each producing a first signal indicative of a bit and a second signal indicative of the complement of said bit;

means for feeding back to each circuit the first signal produced by said circuit at the time said signal is produced;

means for feeding back to each circuit the second signal produced by each of the four remaining circuits at the time said four remaining circuits produce said second signals; and means for applying to each circuit a timing signal which changes in value between levels representing binary 1 and binary 0.

2. A decade counter as set forth in claim 1, wherein each circuit comprises threshold gate means.

3. A decade counter as set forth in claim 1, wherein each circuit comprises five OR gates for receiving signals supplied to said circuit and an AND/NAND gate for receiving the five signals produced by the five OR gates and for producing said first and second signals.

4. A decade counter as set forth in claim 1, wherein each circuit comprises five NOR gates for receiving signals supplied to said circuit and an OR/NOR gate for receiving the five signals produced by the five NOR gates and for producing said first and second signals.

5. A decade counter as set forth in claim 1, wherein each circuit comprises a five-input circuit threshold gate, each input circuit of weight 1, and said gate having a threshold of four, three of said input circuits comprising OR gate means.

6. A decade counter as set forth in claim 1, wherein each circuit comprises a five-input threshold gate, each input of weight 1, and said gate having a threshold of four, and three two-input OR gates supplying signals to three of said inputs to said threshold gate, and further including a feedback connection for feeding back the first signal produced by said threshold gate to the fourth input thereto and to one input to one OR gate, said timing signal being applied to the fifth input to said threshold gate, and the other input to said one OR gate and the two remaining OR gates for receiving the second signal produced by the four other circuits of said counter.

UNITED STATES PATENT OFFICE
CERTIFICATE OF CORRECTION

Patent No. 3,600,561 Dated August 17, 1971

Inventor(s) Robert O. Winder

It is certified that error appears in the above-identified patent and that said Letters Patent are hereby corrected as shown below:

Col. 2, line 20 (table) - last "0" under col. d should read --1--

Col. 2, line 20 - last "1" should be deleted

Col. 3, line 13 - "$(\overline{c}+\overline{e}+b)\cdot(d+\overline{e})$" should read --$(\overline{c}+e+\overline{b})\cdot(\overline{d}+e)$--

Col. 3, line 14 - "$(\overline{b}+\overline{d}+a)\cdot(c+\overline{d})$" should read --$(\overline{b}+d+\overline{a})\cdot(\overline{c}+d)$--

Col. 3, line 15 - "$(\overline{a}+\overline{c}+e)\cdot(b+\overline{c})$" should read --$(\overline{a}+c+\overline{e})\cdot(\overline{b}+c)$--

Col. 3, line 16 - "$(\overline{e}+\overline{b}+d)\cdot(a+\overline{b})$" should read --$(\overline{e}+b+\overline{d})\cdot(\overline{a}+b)$--

Col. 3, line 17 - "$(\overline{d}+\overline{a}+c)\cdot(e+\overline{a})$" should read --$(\overline{d}+a+\overline{c})\cdot(\overline{e}+a)$--

Signed and sealed this 25th day of January 1972.

(SEAL)
Attest:

EDWARD M. FLETCHER, JR.
Attesting Officer

ROBERT GOTTSCHALK
Commissioner of Patents